United States Patent
MacInnis et al.

(10) Patent No.: US 7,529,330 B2
(45) Date of Patent: *May 5, 2009

(54) CLOSED LOOP SUB-CARRIER SYNCHRONIZATION SYSTEM

(75) Inventors: Alexander G. MacInnis, Ann Arbor, MI (US); Aleksandr Movshovich, Santa Clara, CA (US); Brad Delanghe, Sunnyvale, CA (US); Ramkumar Prakasam, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/118,124

(22) Filed: May 9, 2008

(65) Prior Publication Data

US 2008/0205566 A1    Aug. 28, 2008

Related U.S. Application Data

(63) Continuation of application No. 10/794,601, filed on Mar. 5, 2004, now Pat. No. 7,372,929.

(60) Provisional application No. 60/452,229, filed on Mar. 5, 2003.

(51) Int. Cl.
*H04L 7/00* (2006.01)

(52) U.S. Cl. .................................... 375/371

(58) Field of Classification Search ............... 375/354, 375/357, 369, 372, 373, 374; 370/395.62, 370/507; 455/265; 702/89; 713/375, 400; 348/549, 537

See application file for complete search history.

(56) References Cited

U.S. PATENT DOCUMENTS

| 4,791,488 A | * | 12/1988 | Fukazawa et al. ............ 348/537 |
| 5,907,366 A | * | 5/1999 | Farmer et al. ................ 348/478 |
| 6,559,859 B1 | * | 5/2003 | Henry et al. ................. 345/690 |
| 7,046,299 B1 | * | 5/2006 | Lowe .......................... 348/500 |

* cited by examiner

*Primary Examiner*—Sam K Ahn
(74) *Attorney, Agent, or Firm*—McAndrews, Held & Malloy, Ltd.

(57) ABSTRACT

A system and method for synchronizing sub-carriers in a signal processing system. Various aspects of the present invention may comprise method steps and structure that receive a sampled signal. Various aspects may produce a synchronization signal based on the sampled signal. Various aspects may generate and store a cropped version of the received sampled signal. Various aspects may read a cropped sampled signal from memory that corresponds to the received sampled signal. Various aspects may generate a restored sampled signal by adding samples to the cropped sampled signal read from memory. Various aspects may, based on the synchronization signal, output the restored sampled signal coarsely synchronized to the received sampled signal. Various aspects may determine a phase difference between the output restored sampled signal and the output received sub-carrier. Various aspects may adjust the phase of the restored sampled signal in response to the determined phase difference.

27 Claims, 4 Drawing Sheets

CLOSED LOOP SUB-CARRIER SYNCHRONIZATION SYSTEM

CROSS-REFERENCE TO RELATED APPLICATIONS/INCORPORATION BY REFERENCE

This patent application is a continuation of U.S. patent application Ser. No. 10/794,601, filed Mar. 5, 2004, issued as U.S. Pat. No. 7,372,929, which makes reference to, claims priority to and claims the benefit of U.S. Provisional Application No. 60/452,229, filed Mar. 5, 2003. The above-referenced United States applications are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Communication systems may utilize sub-carriers to modulate communicated information. Digital communication systems may sample signals prior to processing the information modulated by the sub-carrier. Digital communication systems may perform a vast array of operations on received signals, including comparing and analyzing signals received at different instances in time.

For example, in the video communication field, a video signal processing system may analyze information in adjacent field or frame lines to determine various characteristics of the incoming video information. The video signal processing system may also compare corresponding field or frame lines in adjacent video fields or frames to determine various characteristics of the incoming video information. The video signal processing system may, for example, perform two-dimensional or three-dimensional comb filtering on an incoming video signal to determine chrominance and luminance information contained in the video signal. Such filtering may involve, for example, utilizing a plurality of field lines in a particular video field (i.e., two-dimensional comb filtering), and may additionally involve, for example, utilizing corresponding field lines in temporally separate video fields or frames (i.e., three-dimensional comb filtering).

It is often desirable, when processing signals received at different times, over different channels or over, for example, different media, to align the signals being processed. This alignment may generally be a temporal alignment, but may also be viewed, for example, as a phase alignment. For example, when processing lines from two video fields in an interlaced video stream, it may be desirable to align the phases of the respective sub-carriers of the lines from the two video fields. Such signals may also have been digitally sampled, in which case, it may be desirable to align the corresponding digital data samples to sample and sub-sample accuracy.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method are provided for synchronizing signals according to their sub-carriers in a signal processing system. Various aspects of the present invention may receive a current sampled signal that includes information modulated using a sub-carrier. Various aspects may generate a synchronization signal based on the current sampled signal or previously received sampled signals. For example, various aspects may, in a video context, generate horizontal sync, vertical sync, and field identity signals. Various aspects may generate a cropped version of the current sampled signal. For example, various aspects may delete samples from the current sampled signal that are not necessary. For example, in a video context, various aspects may delete samples from the current sampled signal that correspond generally to information that does not correspond to active video information. Various aspects may then store the cropped version of the current sampled signal in memory. Various aspects may also store in memory an indication of which samples were cropped to form the cropped version of the current sampled signal.

Various aspects of the present invention may retrieve a cropped stored sampled signal from memory that corresponds to the current sampled signal. Various aspects may generate a restored sampled signal based on the cropped stored sampled signal by, for example, adding samples to the cropped stored sampled signal. Various aspects may, for example, read from memory an indication of which samples were cropped from the original sampled signal to form the cropped stored sampled signal. Various aspects may then add samples to the cropped stored sampled signal according to the indication of removed samples.

Various aspects of the present invention may output the restored sampled signal and the current sampled signal coarsely synchronized. Various aspects may, for example, utilize the synchronization signal to effect such coarse synchronization. Various aspects of the present invention may analyze the phase difference between the sub-carrier of the output current sampled signal and the sub-carrier of the output restored sampled signal and generate an indication of phase difference. Various aspects may then adjust the timing or phase of the output signals in response to the indication of phase difference. Various aspects of the present invention may continually monitor the phase difference between the sub-carriers of the output restored sampled signal and the output current sampled signal to determine if synchronization is lost.

These and other advantages, aspects and novel features of the present invention, as well as details of illustrative aspects thereof, will be more fully understood from the following description and drawings.

DETAILED DESCRIPTION OF THE INVENTION

Figure 1:
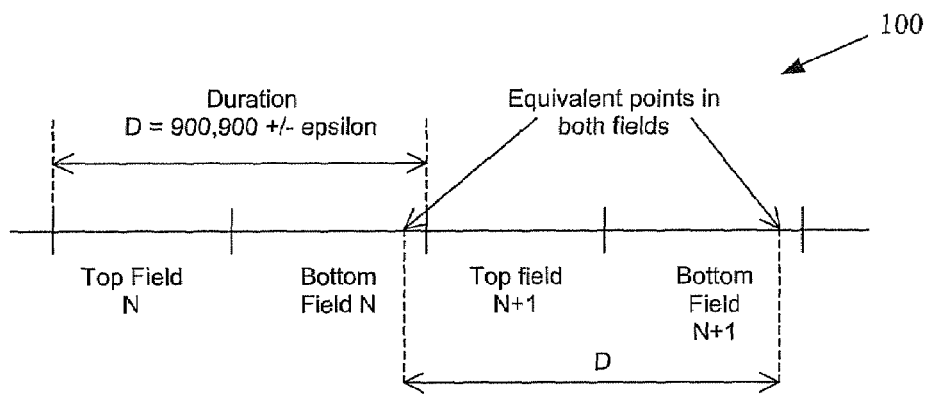
FIG. 1 is a diagram illustrating exemplary video frame interval timing.

FIG. 1 is a diagram 100 illustrating exemplary video frame interval timing. The illustrated example is a diagram for a typical interlaced video stream. The exemplary video stream includes an interlaced structure of top and bottom video fields. Each field, in turn, may include a plurality of video lines. For the following discussion, the Bottom Field N will be considered to be the bottom field following Top Field N. This is a convention for the following discussion and should by no means limit the scope of various aspects of the present invention. For example and without limitation, a Top Field N and a Bottom Field N may be paired under certain conditions and the Bottom Field N and Top Field N+1 may be paired under certain other conditions.

Top Field N may include a plurality of video lines, and Bottom Field N may include a plurality of video lines interlaced with the video lines of Top Field N. Top Field N+1 may have a plurality of video lines that correspond spatially, but not temporally, with the plurality of video lines in Top Field N. Similarly, Bottom Field N+1 may, for example, have a plurality of video lines that correspond spatially, but not temporally, with the plurality of video lines in Bottom Field N.

A video signal processing system may process spatially corresponding video lines in temporally spaced video fields. For example, a video signal processing system may process line X of Bottom Field N and line X of Bottom Field N+1 simultaneously. Such a video signal processing system may, for example, add or subtract samples from the corresponding lines. In such a signal-processing scenario, it may be desirable for the system to synchronize the sub-carrier used to modulate information of Bottom Field N, line X and the sub-carrier used to modulate information of Bottom Field N+1, line X. For example, the system may synchronize the sub-carriers by adjusting the phase of one or more of the video signals.

Additionally, by the time the system performs such synchronization, the system may, for example, only have digital samples of originally analog signals. If the sampling period is greater than the desired sub-carrier synchronization resolution, it may be desirable for the system to have the capability to synchronize the sampled signals with a resolution that is smaller than the period at which the original signals were sampled (i.e., perform fractional sample synchronization).

Note that though the example illustrated in FIG. 1 relates to a typical interlaced video stream, and the following discussion may present aspects of the present invention in the context of a video stream, the scope of the present invention should, by no means, be limited to video streams or the processing thereof. For example, and without limitation, many of the various aspects of the present invention apply to the audio context as well as the video context.

Figure 2:
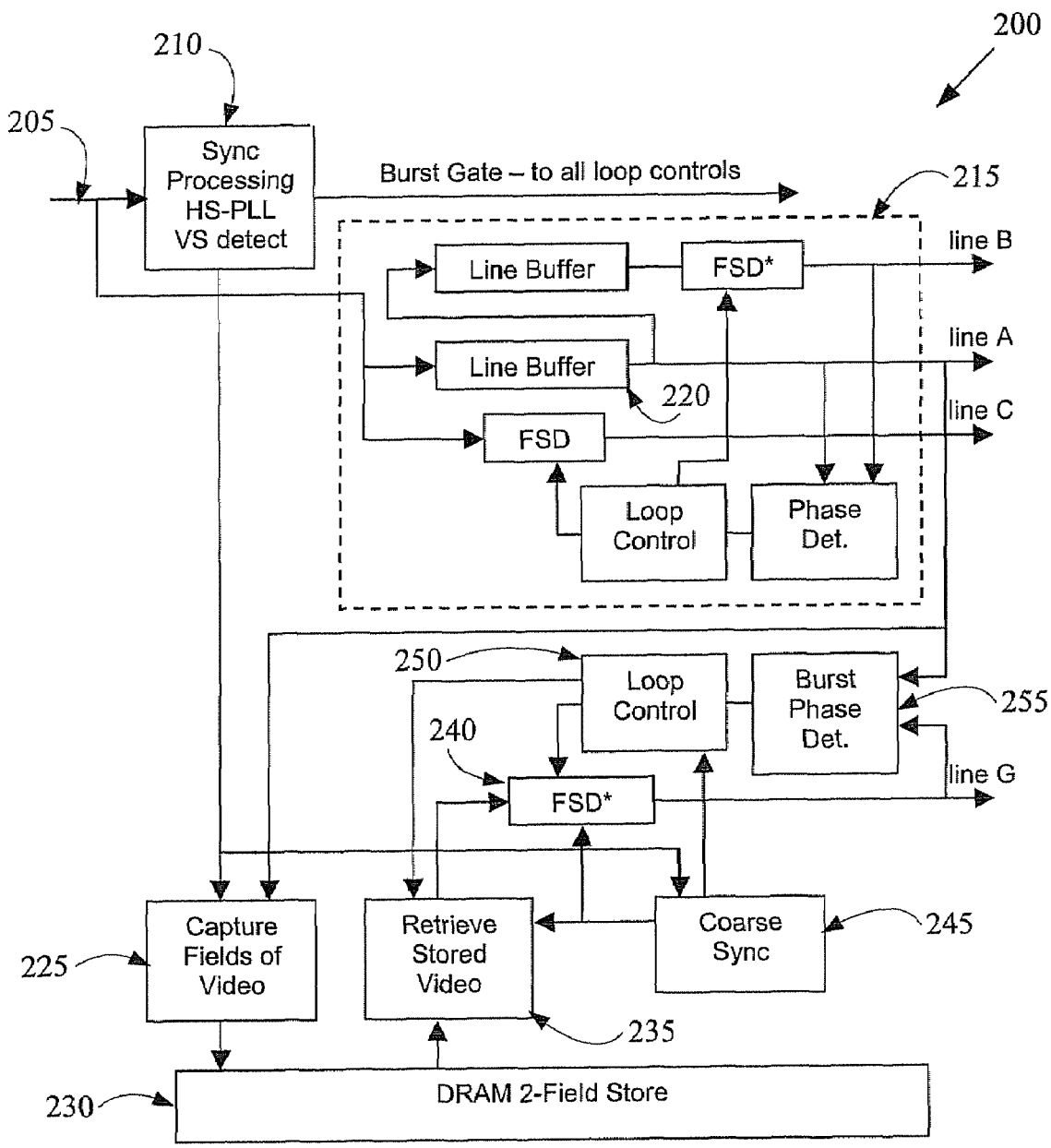
FIG. 2 is a diagram illustrating aspects of a system for synchronizing video signals according to their sub-carriers in accordance with various aspects of the present invention.

FIG. 2 is a diagram illustrating aspects of a system 200 for synchronizing signals according to their sub-carriers in accordance with various aspects of the present invention. Though the exemplary system 200 is generally directed to outputting synchronized video signals, and the system 200 will be described in the video context, the system 200 is an illustrative system. Accordingly, the scope of various aspects of the present invention is, by no means, to be limited to video apparatus and methods.

In the exemplary system 200, incoming video arrives on the video input line 205. The sync processor 210 receives incoming video on the video input line 205 and processes the incoming video. The sync processor 210 may, for example, process information from an incoming sampled video signal to determine indications of horizontal and vertical sync. The sync processor 210 may utilize phase lock loop circuitry to produce and output horizontal and vertical sync signals. The sync processor 210 may output a horizontal sync signal near the beginning of each incoming line of video information. Similarly, the sync processor 210 may output a vertical sync signal near the beginning of each incoming field or frame of video information. Various system components may receive the horizontal and vertical sync signals and use the horizontal and vertical sync signals for timing synchronous signal processing activities.

The sync processor 210 may also determine a field identifier for incoming video information and output the field ID signal to various system components. Such a field identifier may, for example, include a sequence number or an indication of polarity of a received video field, such as a "top field" and "bottom field" indication. The sync processor 210 may also determine other signals from the incoming video to be used by the system 200 for synchronization and other timing-based decisions.

Various aspects of the illustrated exemplary synchronization system 200 are generally directed to synchronizing adjacent video lines in the same video field using line buffering. Such aspects and components may be, for example, enclosed in dashed block 215. The following discussion will generally focus on other aspects of the exemplary synchronization system 200, addressing components in the dashed block 215 when necessary. For example, line buffer 220 receives an incoming sampled signal carrying a line of video information and delays outputting the sampled signal for approximately one line period. The line buffer 220 outputs the delayed sampled signal on line A. In the following discussion, the sampled signal output from the line buffer 220 on line A will be referred to as the "current sampled signal."

The field capture module 225 receives the current sampled signal from the line buffer 220. The field capture module 225 may also receive a variety of signals from the sync processor 210. Such signals may include, for example, a horizontal sync signal, a vertical sync signal and an indication of polarity of the video field corresponding to the current sampled signal. The field capture module 225 generally captures sampled signal information into memory.

The field capture module 225 may, for example, crop unwanted information from the current sampled signal, thereby conserving memory resources. The field capture module 225 may determine the field polarity of the current video field of which the current sampled signal is a part. The field capture module 225 may determine which lines of the current video field carry active video information and which samples of those lines carry active video information. Such information may, for example, be predetermined and stored in registers. Alternatively, such information may be variable and responsive to real-time conditions.

Figure 3:
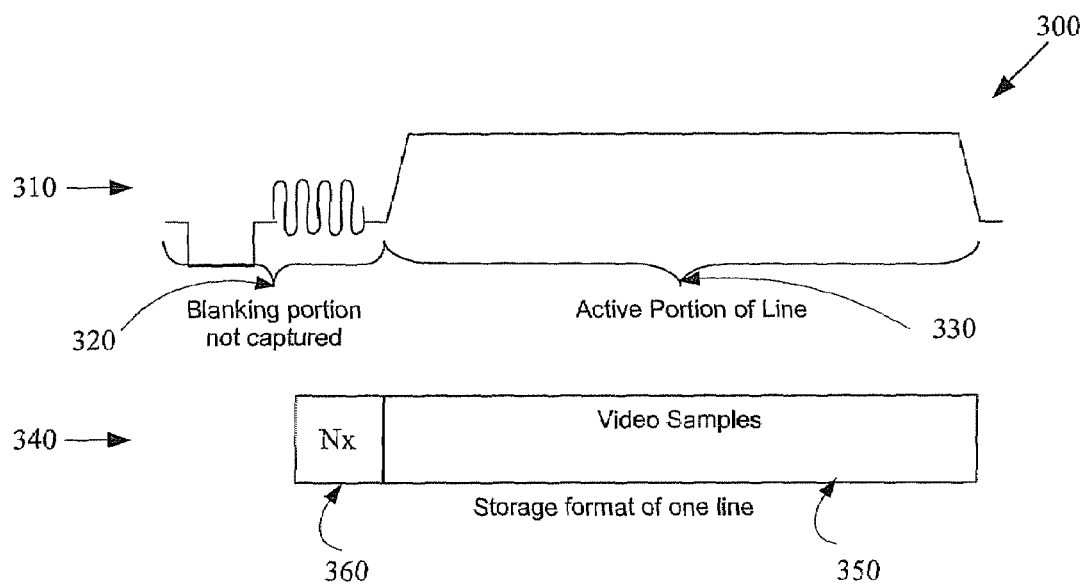
FIG. 3 is a diagram illustrating aspects of stored video signal samples and additional information in accordance with various aspects of the present invention.

For example, FIG. 3 shows a diagram 300 illustrating aspects of stored video signal samples and additional information in accordance with various aspects of the present invention. The diagram shows an exemplary line of video 310, which may include data and synchronization information in a blanking portion 320 and active video data in an active video portion 330. The diagram 300 also shows an exemplary stored portion 340 of video information that may correspond to stored portions of the exemplary line of video 310. The exemplary stored portion 340 may, for example, include an active video information portion 350, corresponding to the active video portion 330 of the exemplary line of video 310, a sub-carrier burst portion 355, corresponding to the sub-carrier burst portion of the exemplary line of video 310, and an additional information portion 360, which may, for example, contain stored information regarding samples cropped from the exemplary line of video 310.

Referring back to FIG. 2, the field capture module 225 may track the line of a video field to which the current sampled signal corresponds. For example, the field capture module 225 may count horizontal synch pulses after each vertical sync pulse to track the video line number corresponding to the current sampled signal. The field capture module 225 may then compare the count of horizontal sync pulses to a register to determine if the current sampled signal carries active video information. The register may vary depending on the polarity of the current video field. For example, in an exemplary video field, the video field may have twenty-one lines of information prior to lines containing active video information. The field capture module 225 may then crop (or discard) lines of video information, or their respective signal samples, that do not contain active video information.

Similarly, for each line of video that contains active video information, the field capture module 225 may track which samples of the current sampled signal contain active video information and which samples contain sub-carrier burst. For example, the field capture module 225 may crop samples from the current sampled signal that correspond to horizontal sync information and other non-active video information at the beginning of the video line. For example, the field capture module 225 may discard samples from the horizontal sync information to the beginning of sub-carrier burst information. The number of samples discarded at the beginning of a video line may be constant or variable, or may be predetermined or determined in real-time. For the following discussion, this number of cropped samples at the beginning of the video line will be referred to as "N1."

After discarding the first N1 samples from the current sampled signal, the field capture module 225 may capture a group of samples corresponding to active video information preceded by a sub-carrier sync burst. The number of samples captured may be constant or variable, or may be predetermined or determined in real-time. For example, the number of samples may be a number of samples corresponding to approximately 55.3 microseconds of active video information preceded by a sub-carrier sync burst. Depending on the sampling rate, this may, for example, correspond to approximately 1.5K samples. For the following discussion, the number of samples captured during this phase will be referred to as "N2." The field capture module 225, during or after capturing the N2 samples of the current sampled signal, may store the N2 samples in a memory 230.

The memory 230 generally stores information. The memory 230 may, for example, include a dynamic random access memory (DRAM). The memory 230 may be general or may be specially adapted for storing multiple video fields of information. The memory 230 may, for example, be adapted to store lines of video information for a top video field and a bottom video field. The memory 230 may include volatile and non-volatile memory. The memory 230 may, for example, be integrated into a module with the field capture module 225 or may be standalone hardware. The memory 230 may include any device that effectively stores information.

After capturing the N2 samples from the current sampled signal, the field capture module 225 may determine the number of signal samples that occur before the field capture module 225 receives the next horizontal sync pulse from the sync processor 210. The field capture module 225 may estimate this number, but it may generally be more accurate to count the samples, particularly in a signal processing system where such number of samples may change. For the following discussion, this number of samples between the last captured sample for a line of video information and the horizontal sync pulse for the next line of video information will be referred to as "N3." The magnitude of N3 may, for example, correspond to approximately a number of samples that occupy 1.5 microseconds. An exemplary magnitude measured in signal samples may be, for example, forty or forty-one.

In a signal processing system where N3 may vary, the field capture module 225 may store the value of N3 in the memory 230. The field capture module 225 may store the value of N3 in a contiguous manner with the N2 captured samples from the current sampled signal. Alternatively, for example, the field capture module 225 may store the value of N3 in any manner that may indicate a relationship between N3 and the current sampled signal.

The field capture module 225 may continue to capture lines of video, or portions thereof, received in sampled signals for a number of lines corresponding to the number of lines containing active video information in the field. The number of lines may be, for example, a predetermined and constant value or may, for example, be a variable value adjustable in real-time. For the present example, the number of lines per field is constant, at least for a particular video field polarity being received. For example the number of lines captured in a video field may be 241.

After capturing information from the last line in a video field, the field capture module 225 may count the number of signal samples that are not captured from the last captured sample of the last video line of a video field to the horizontal sync signal for the first line to be captured in the next video field. For the following discussion, this number will be referred to as "N4." N4 may have a value of, for example, 37,752. The field capture module 225 may store the value of N4 similar to the value of N3. During initialization, the first value of N4 may be zero, since a previous field has not yet been captured.

Table 1 shows an illustrative data structure that the field capture module 225 may form in the memory 230. The value of N4, which may be the number of signal samples skipped between the last sample stored from the previous video field and the horizontal sync pulse before the first sample captured in the next video field, may be stored with the stored samples for the first line captured. The value of N3_1, which may be the number of signal samples skipped between the last sample of the first line captured and the horizontal sync pulse before the first sample of the second line captured, may be stored with the stored samples for the second line captured, and so on. Note, however, that this data structure is only exemplary and should, by no means, limit the scope of various aspects of the present invention.

TABLE 1

| | |
|---|---|
| N4 | Line 0 (first line captured) |
| N3_1 | Line 1 (second line captured) |
| N3_2 | Line 2 |
| N3_3 | Line 3 |
| N3_... | Line ... |
| N3_239 | Line 239 |
| N3_240 | Line 240 |

The previously described cropping functionality is exemplary and should, by no means, limit the scope of various aspects of the present invention to cropping functionality. For example, the field capture module 225 may not perform cropping. Alternatively, for example, the field capture module 225 may generate some other signal derived from the original sampled signal.

The field retrieve module 235 retrieves stored video information from the memory 230 that the field capture module 225 stored in the memory 230. The field retrieve module 235 may retrieve the stored video information in coarse synchronization with currently received video information. For the system 200 to output and align stored video information with currently received video information, the field retrieve module 235 may read stored video information out of memory in advance of the need for such stored video information at the system output.

The field retrieve module 235 may operate in a coarse synchronization mode. When the system 200 is in a coarse sync mode, the field retrieve module 235 may read, for example, the first set of samples of the first line of video of the designated field buffer in the memory 230. The field retrieve module 235 may feed a number of samples to the fractional sample delay (FSD) filter 240 in preparation for outputting corresponding video information in synchronization with current video information output from the line buffer 220.

The field retrieve module 235 may then wait to receive a signal to proceed from the coarse sync module 245. Once the field retrieve module 235 receives a signal to proceed from the coarse sync module 245, the field retrieve module 235 may continually retrieve samples from the memory 230 and pass the retrieved samples, along with additional samples, to the FSD filter 240 until directed to stop by the coarse sync module 245.

The field retrieve module 235 may reconstruct video signals from information retrieved from the memory 230. In this reconstructing process, the field retrieve module 235 may access information used or determined by the field capture module 225 during the field capture process. For example, the field retrieve module 235 may retrieve samples of stored active video information from the memory 230 corresponding to a first video line and output the retrieved samples. The field retrieve module 235 may then obtain the N3 value associated with the number of samples that the field capture module 225 cropped between the captured samples of the first video line and the horizontal sync of the second video line. The field retrieve module 235 may then insert N3 samples after the output samples for the first video line to replace the N3 samples that were cropped (or deleted) by the field capture module 225. The replaced samples may be, for example, null data samples.

The field retrieve module 235 may then obtain the N1 value associated with the number of samples that the field capture module 225 cropped between the horizontal sync of the second video line and captured samples of the second video line. The field retrieve module 235 may then insert N1 samples after the N3 samples just inserted to replace the N4 samples that were cropped from the second video line by the field capture module 225.

After retrieving, restoring and outputting the stored video samples corresponding to a last line of a video field, the field retrieve module 235 may then obtain the N4 value associated with the number of samples that the field capture module 225 cropped between the last captured sample of the last captured line of the video field and the horizontal sync for the first captured line of the next field. The field retrieve module 235 may then insert N4 samples to replace the samples cropped by the field capture module 235. The field retrieve module 235 may then insert N1 samples to replace the samples removed from the first captured video line of the next field by the field capture module 235 between the horizontal sync signal and the captured samples of the video line.

The field retrieve module 235 may also be responsive to a sample adjust signal from the loop control module 250. In response to the sample adjust signal, the field retrieve module 235 may, for example, either advance or delay the transmission of the retrieved and reconstructed video by one sample. The loop control module 250 may utilize this capability of the field retrieve module 235 to adjust the synchronization (or timing) between the current and retrieved video by a full sample. For example, by inserting a null sample in the retrieved and reconstructed video, the field retrieve module 235 may delay the timing of the retrieved video information by one sample relative to the current video, and the field retrieve module 235 may advance the timing of the retrieved and reconstructed video by one sample relative to the current video by deleting a sample from the retrieved video.

The loop control module 250, which will be discussed in more detail later, controls the FSD filter 240 by fractional samples. When the loop control module 250 adjusts the delay of the FSD filter 240, and that adjustment creates a carry-out from the fractional portion of the sample timing, that carry-out may trigger the loop control module 250 to output a sample adjust signal to the video retrieve module 235 to effect a whole-sample timing adjustment.

The loop control module 250 may be configured to modify the fractional sample delay from the FSD filter 240 and the full sample delay from the field retrieve module 235 near, for example, the end of a video line. Thus, the field retrieve module 235 may receive the video adjust signal when the field retrieve module 235 is adding null samples to the retrieved video information. The field retrieve module 235 may then adjust the number of samples inserted before or after the retrieved video line that the field retrieve module 235 is presently reconstructing.

The coarse sync module 245 generally determines the sync lock status of the system. The coarse sync module 245 may determine, for example, when the system 200 is in an unlocked state, waiting to acquire coarse synchronization, or in a coarse locked state. The coarse sync module 245 may also monitor the coarse synchronization status during operation to determine if synchronization problems arise.

The synchronization status of the system 200 is unlocked, for example, when the system is initialized. The system 200 may enter an unlocked state during operation for various reasons, for example, the arrival of particular non-standard video signals. When in the unlocked state, the coarse sync module 245 may direct the FSD filter 240 not to adjust the timing (or phase) of the retrieved video signal from the field retrieve module 235. The FSD filter 240 may then remain in this no-time-shift state until directed to resume time-shifting operation by the coarse sync module 245. In other words, the coarse sync module 245 may effectively shut down fine sync operation when the coarse sync module 245 determines that coarse synchronization does not exist.

The coarse sync module 245 may synchronize the system according to the horizontal sync signal from the sync processor 210. For example, when incoming video arrives at the video input line 205, the sync processor 210 may signal the field capture module 225 and the course sync module 245 when the sync processor determines that it has obtained valid sync. Valid sync may include, for example, a reliable lock on horizontal sync, vertical sync and field ID of the incoming video. The field capture module 225 may then, for example, capture the next two video fields arriving to fill the top and bottom field buffers in the memory 230. Note that the twovideo-field capture is merely exemplary, and accordingly, the scope of various aspects of the present invention should, by no means, be limited to two fields or to video information in general. The coarse sync module 245 may wait for the field capture module 225 to accomplish this field buffer loading.

Near the end of capturing two consecutive fields in the memory 230, the coarse sync module 245 may direct the field retrieve module 235 to read the start of the field buffer with the field polarity matching the next expected arriving field of video. The field retrieve module 235 may, for example, read the first set of video samples for the appropriate stored field and wait for the coarse sync module 245 to signal the field retrieve module 235 to proceed. The coarse sync module 245 may then monitor the signals from the sync processor 210 to determine when the currently arriving video is at a sample point matching that of the corresponding first stored sample. For example, the coarse sync module 245 may count horizontal sync signals from the sync processor 210 to determine when the current arriving video corresponds to the first stored line of video. Then the coarse sync module 245 may count to the sample of the current video line that matches the first stored sample.

For example, the N+1th sample of the current video line may follow the horizontal sync of the current video line by N1 samples. The first sample of a line of stored video may be the N1+1th sample of that line and may follow the horizontal sync signal of the stored video line by N1 samples. Therefore, starting the stored video on the N1+1th sample at the same time as the N1+1th sample of current video may result in the stored video being synchronized with the current video to the nearest clock cycle, with reference to the horizontal sync signal.

Once coarse synchronization lock has been achieved, the coarse sync module 245 may direct the components of the fine synchronization loop, including the loop control module 250, to begin fine sync operation. During operation of the fine synchronization loop, the coarse sync module 245 may, for example, continually compare the N1+1th samples of the current and stored video for each active line of video. The coarse sync module 245 may, for example, contain a register that determines how many sample times of difference are allowed before the coarse sync module 245 declares an out of sync condition. Upon declaring an out of sync condition, the coarse sync module 245 may disable the fine sync loop and notify other system components that depend on synchronization of the out-of-sync condition.

The fractional sample delay (FSD) filter 240 operates to delay a sampled input signal by a fraction (typically a binary fraction) of the sampling interval of the sampled input signal. For example, the FSD filter 240 may delay the sampled input signal by steps of 1/32 of the sample interval of the input signal. The FSD filter 240 may, for example, utilize a poly-phase filter as a delay element. The loop control module 250 may indicate to the FSD filter 240 the number of fractional samples to delay the sampled input signal. The FSD filter 240 may then output the fractional phase shifted stored video signal on line G.

The FSD filter 240 may utilize a filter having a particular number of taps. During acquisition of coarse lock, as discussed previously, the field retrieve module 235 may forward a number of samples to the FSD filter 240 to prepare the FSD filter 240 to output the retrieved sampled signal upon command (i.e., to "prime" the FSD filter 240). This number of samples may depend, for example, on the number of taps used in the FSD filter 240 and on other aspects of the FSD filter 240 configuration.

The burst phase detector 255 receives the current video output from the line buffer 220 on line A and receives the stored video output from the FSD filter 240 on line G. The burst phase detector 255 may analyze the sub-carrier bursts from the two input signals and measure the difference in phase between the sub-carrier bursts. The burst phase detector 255 may then output this difference to the loop control module 250. Aspects of the burst phase detector 255 will be discussed in more detail in the discussion of FIG. 4.

The loop control module 250 performs synchronization between the current and stored video signals. The loop control module 250 generally performs sub-carrier burst synchronization that may be considered fine synchronization relative to the horizontal sync-based synchronization coordinated by the coarse sync module 245. The loop control module 250, generally in conjunction with the phase detector and the FSD filter 240, effectively implement a phase lock loop. The reference input may be the sub-carrier burst from the current sampled signal, the feedback input may be the sub-carrier burst from the stored sampled signal, and the control variable may be the delay of the stored sampled signal output, as implemented in fractional samples by the FSD filter 240 and whole samples by the field retrieve module 235. The loop control module 250 may, for example, be constrained to adjust its delay control output after the end of an active video line (e.g., during the horizontal blanking interval). Aspects of the loop control module 250 and the burst phase detector 255 will now be discussed in more detail with regard to FIG. 4.

Figure 4:
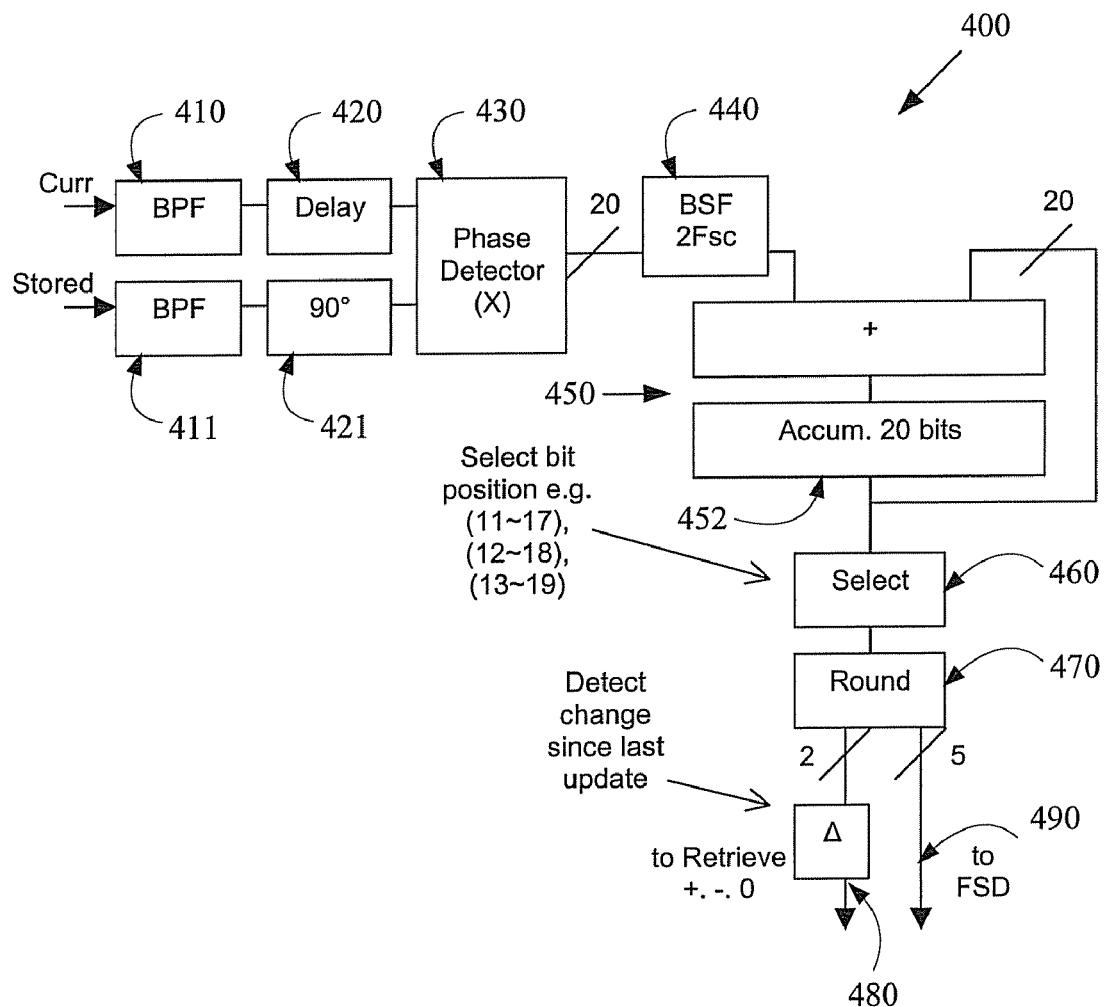
FIG. 4 is a diagram illustrating aspects of synchronization control in accordance with various aspects of the present invention.

FIG. 4 is a diagram illustrating exemplary portions of a synchronization control loop 400 in accordance with various aspects of the present invention. Current and stored sampled video signals may be input to respective band-pass filters 410-411. The band-pass filters 410-411 may, for example, remove DC components of the sampled video signals. The stored sampled video signal output from its respective band-pass filter 411 may be input to a 90-degree phase shifter 421. The 90-degree phase shifter 421 may, for example, be implemented using a Hilbert filter. The 90-degree phase shifter 421 may have, for example, an inherent sample delay. Accordingly, to maintain synchronization between the current and stored sampled video signals, the current sampled signal output from its respective band-pass filter 410 may be input to a delay element 420.

The output signals from the 90-degree phase shifter 421 and the delay element 420 may be input to a phase detector circuit 430. The phase detector circuit 430 may multiply corresponding sync burst samples from the delayed current sampled signal and the phase-shifted and delayed stored signal. The phase detector circuit 430 may then output a series of samples during the burst, which represent the phase difference between the burst samples.

Since the phase detector circuit 430 phase difference output may contain higher frequency components, such as a frequency component at twice the sub-carrier frequency, the output of the phase detector circuit 430 may be filtered using a band-stop filter 440 to remove such undesirable frequency components.

The output of the band-stop filter 440 may be coupled to the input of an integrator 450. The integrator 450 may, for example, include an accumulator 452 that keeps a running sum of the filtered output samples from the phase detector 430 during sync bursts. For example, every sample during a burst, the phase detector 430 may output a product of its input samples as an indication of phase difference. Accordingly, the accumulator 452 may sum these phase difference indications for the duration of the sync burst. The accumulator 452, or integrator 450, may, for example, be configured to perform the accumulation, or integration, only when the input to the phase detector circuit 430 includes samples of the sub-carrier bursts.

The accumulator 452 may output the accumulated sum of the phase difference indications to a bit selector 460 that selects the bits from the accumulator 452 output on which to base a fractional sample phase shift decision. The bit position of the selected bits may generally determine the gain of the phase control loop. The selected bits from the bit selector 460 may also be rounded 470 to arrive at an appropriate phase shift command. An overflow in the accumulator 452 may, for example, be used by the loop control module 250, as mentioned earlier, to signal the field retrieve module 235 to effect a full-sample phase shift to the retrieved video signal. Such a phase-shift signal may be output to the field retrieve module 235, for example, on line 480. The fractional sample phase shift command may then be output to the FSD filter 240 on line 490.

Various aspects of the systems shown in FIGS. 2 and 4 may be implemented in a variety of hardware and software implementations. For example, the time-sensitive or processing-intensive modules may be performed in integrated hardware modules, while various other aspects may be implemented using a processor executing software or firmware instructions. Accordingly, the scope of various aspects of the present invention should, by no means, be limited to particular hardware or software configurations.

Figure 5:
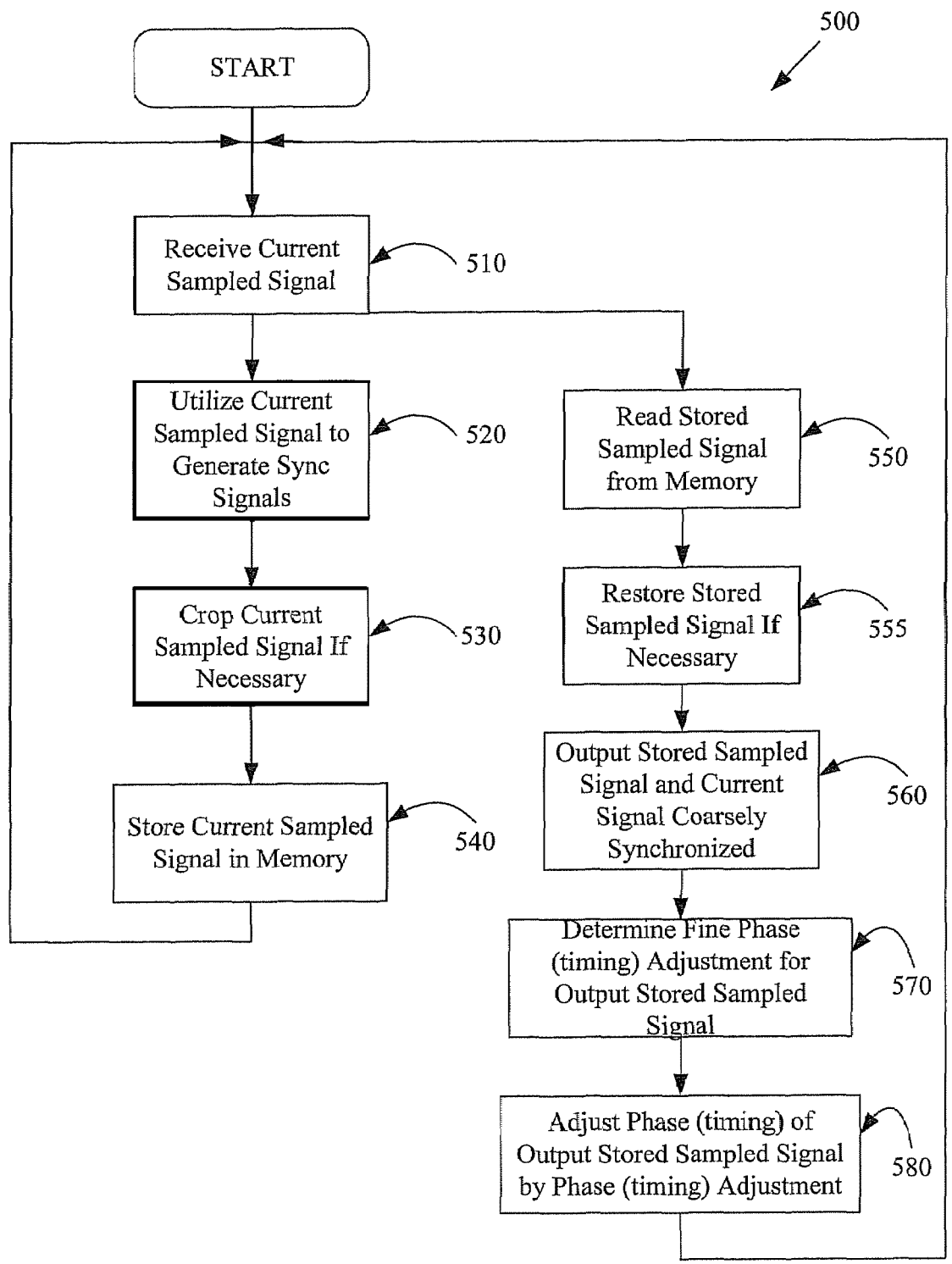
FIG. 5 is a diagram illustrating aspects of a method for synchronizing video signals according to their sub-carriers in accordance with various aspects of the present invention.

FIG. 5 is a diagram illustrating aspects of an exemplary method 500 for synchronizing video signals according to their sub-carriers in accordance with various aspects of the present invention. The method 500 includes receiving a current sampled video signal 510, for example. The method 500 may generate synchronization signals 520, for example, a horizontal sync signal, a vertical sync signal, and a video frame polarity indication. Such synchronization signals may be utilized by various other method and system aspects for timing and synchronization.

The method 500 may include cropping the current sampled signal 530 to remove samples representing information for which storage is unnecessary. For example, the cropping step 530 may include cropping data information contained in horizontal and vertical blanking intervals and may include cropping portions of video synchronizing information. The cropping step 530 may, for example, crop information in a line of video information between a horizontal sync signal for the line of video information and sub-carrier burst information for the line of video information. The cropping step 530 may also include, for example, cropping information following active video information in a line of video information.

The previously described cropping step is exemplary and should, by no means, limit the scope of various aspects of the present invention to cropping functionality. For example, the method 500 may skip the cropping step 530, choosing to present the original sampled signal to the following storing step 540. Alternatively, for example, the method 500 may include an alternative step to the cropping step 530 that generates some other signal derived from the original sampled signal.

The method 500 may further include storing the cropped current sampled signal in memory 540. The storing step 540 may include storing information indicating which samples were cropped from the current sampled signal. Such information may be utilized later, for example, in reconstructing the stored signal after portions of the stored signal are read out from memory. The method 500 may include storing a plurality of video fields of video lines 540. The storing step 540 may include, for example, storing an entire prior frame of video lines prior to the current video line.

In addition to storing portions of the current sampled signal, the method 500 may also output the current sampled signal and a sampled signal retrieved from memory in a phase-synchronized fashion. The method 500 may include reading a stored sampled signal from memory 550 that corresponds to the current sampled signal. For example, the stored sampled signal may correspond to the current sampled signal in the previous video frame. For example, the current sampled signal may be carrying video information from line 50 of video frame N, and the stored sampled signal may be carrying video information from line 50 of video frame N−1.

The method 500 may then restore the stored sampled signal 555 to at least the approximate length of the stored sampled signal prior to cropping. For example, the cropping step 530 may have removed the first N samples of the stored sampled signal prior to storage. The restoring step 555 may then restore the N samples of the stored sampled signal by inserting null data samples in place of the N cropped samples. The restoring step 555 may obtain an indication of N from a register, or may, for example, read the value of N from memory when reading the corresponding stored sampled signal from memory.

The method 500 may then output the restored sampled signal 560 coarsely synchronized with the current sampled signal. For example, the outputting step 560 may include utilizing synchronization signals generated in the sync signal-generating step 520. For example, the outputting step 560 may include timing the output of the restored sampled signal based on a horizontal sync signal and vertical sync signal obtained from the current sampled signal.

The method 500 may then determine a fine phase (or timing) adjustment 570 for synchronizing the output current sampled signal and the output restored sampled signal. The fine phase (or timing) adjustment-determining step 570 may include, for example, determining a phase (or timing) difference between the output current sampled signal and output restored sampled signal by measuring phase difference between their respective sync burst signals. The fine phase adjustment-determining step 570 may, for example, utilize components and methods discussed previously with regard to the systems illustrated and described in FIGS. 2 and 4. The fine phase adjustment determining step 570 may include determining a fine phase adjustment by calculating an integer number of fractional sample intervals that correspond most closely to the desired phase adjustment.

The method 500 may then include adjusting the phase (or timing) 580 of the restored sampled signal according to the determined fine phase (or timing) adjustment. The fine phase adjusting step 580 may include, for example, utilizing a fractional sample delay filter, which may include a poly-phase filter, to adjust the timing of the output restored sampled signal by a fraction (typically a binary fraction) of the sampling interval of the sampled signal. The fine phase adjusting step 580 may also include adjusting the phase of the output restored sampled signal by whole samples by inserting or deleting whole samples from the output restored sampled signal.

The method 500 may continue receiving, cropping, storing and outputting current sampled signal signals. The method 500 may also continue reading, restoring, outputting and synchronizing stored sampled signal signals corresponding to the current sampled signal.

The method 500 was described in the context of video signals. However, the scope of various aspects of the present invention should, by no means, be limited to video systems and methods. For example, various aspects of the present invention may be utilized for any system that outputs synchronized signals. Such a system may include, for example, a system that processes time-shifted audio signals.

The previous discussion generally focused on outputting a pair of synchronized signals. However, in no way, should the scope of various aspects of the present invention be limited to systems and methods for generating only a pair of synchronized signals. Various aspects of the present invention are readily extendible to outputting any plurality of synchronized signals or groups of synchronized signals.

In summary, various aspects of the present invention provide a system and method for synchronizing signals in a signal processing system. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for synchronizing sampled signals, the method comprising:
    using one or more circuits to perform the steps of:
        receiving a first sampled signal;
        generating a signal comprising a portion of the first sampled signal;
        storing the generated signal in a memory;
        receiving a second sampled signal;
        reading the generated signal from the memory;
        generating a restored sampled signal using the generated signal;
        outputting the second sampled signal; and
        outputting the restored sampled signal synchronized to the second sampled signal.

2. The method of claim 1, further comprising storing in the memory an indication of a portion of the first sampled signal not used in the generated signal.

3. The method of claim 2, wherein said generating a restored sampled signal comprises reading from the memory the indication of the portion of the first sampled signal not used and adding samples to the generated signal read from the memory according to the indication of the portion of the first sampled signal not used.

4. The method of claim 1, wherein the first sampled signal carries video information, and said generating the signal comprising the portion of the first sampled signal comprises removing at least a portion of samples from the first sampled signal that correspond to non-active video information.

5. A method for synchronizing sampled signals, the method comprising:
    using one or more circuits to perform the steps of:
        receiving a sampled signal;
        retrieving a stored sampled signal from a memory;
        generating a coarse synchronization signal;
        outputting the sampled signal;
        outputting the stored sampled signal in response to the coarse synchronization signal;
        determining a phase difference between the output sampled signal and the output stored sampled signal;
        determining a phase adjustment based on the phase difference between the output sampled signal and the output stored sampled signal; and
        adjusting the phase of at least one of the output sampled signal and the output stored sampled signal according to the determined phase adjustment.

6. The method of claim 5, wherein said determining a phase adjustment comprises determining the phase adjustment by converting the phase difference to at least one of a number of samples and a number of fractional samples.

7. The method of claim 6, wherein said adjusting the phase comprises time shifting the output stored sampled signal by at least one of the number of samples and the number of fractional samples.

8. The method of claim 5, further comprising monitoring coarse synchronization between the output sampled signal and the output stored sampled signal by comparing arrival times of predetermined corresponding samples in the output sampled signal and the output stored sampled signal.

9. The method of claim 8, wherein the arrival times are measured relative to the generated coarse synchronization signal.

10. The method of claim 5, wherein said generating a coarse synchronization signal comprises generating the coarse synchronization signal using a phase lock loop locked to horizontal sync signals in a stream of sampled signals carrying respective video line information.

11. A system for synchronizing a first sampled signal and a second sampled signal, the system comprising:
    one or more circuits that receives the first sampled signal and generates a synchronization signal based on at least one of the first sampled signal and a sampled signal preceding the first sampled signal;
    said one or more circuits retrieves a stored sampled signal from a memory and generates the second sampled signal based on the stored sampled signal;
    said one or more circuits receives the synchronization signal and the second sampled signal and outputs the second sampled signal synchronized to the first sampled signal in response to the synchronization signal; and
    said one or more circuits receives the first sampled signal and receives the second sampled signal output and generates an indication of phase difference between the first sampled signal and the second sampled signal.

12. The system of claim 11, wherein said one or more circuits comprises a sub-circuit that receives the indication of phase difference and the second sampled signal and adjusts output timing of the second sampled signal based on the indication of phase difference.

13. The system of claim 12, wherein the sub-circuit comprises a fractional sample delay filter.

14. The system of claim 11, wherein said one or more circuits comprises a sub-circuit that determines the phase difference between the first and second sampled signals by analyzing sub-carrier burst signals in each of the first and second sampled signals.

15. The system of claim 11, wherein the indication of phase difference comprises an integer number of fractional samples.

16. A system for synchronizing a first sampled signal and a second sampled signal, the system comprising:
    a first logic circuit that comprises a memory;
    a second logic circuit that receives the first sampled signal and generates a signal comprising a portion of the first sampled signal;
    a third logic circuit coupled to the first and second logic circuits that receives the generated signal from the second logic circuit and stores the generated signal in the first logic circuit;

a fourth logic circuit coupled to the first logic circuit that retrieves the generated signal stored in the first logic circuit and generates a restored sampled signal using the generated signal;

a fifth logic circuit coupled to the fourth logic circuit that receives the restored sampled signal from the fourth logic circuit and outputs the restored sampled signal synchronized with the second sampled signal.

17. The system of claim 16, wherein a portion of the first sampled signal not used by the second logic circuit to generate the generated signal corresponds to non-active video information.

18. The system of claim 16, wherein the second logic circuit outputs an indication of a portion of the first sampled signal not used by the second logic circuit to generate the generated signal and the third logic circuit stores the indication of the portion of the first sampled signal not used in the first logic circuit.

19. The system of claim 18, wherein the fourth logic circuit further retrieves from the first logic circuit the indication of the portion of the first sampled signal not used and adds samples to the generated signal according to the indication of the portion of the first sampled signal not used.

20. The system of claim 16, further comprising a sixth logic circuit coupled to the fifth logic circuit that receives the second sampled signal and generates a synchronization signal based on the second sampled signal, and wherein the fifth logic circuit receives the synchronization signal from the sixth logic circuit and outputs the restored sampled signal in response to the synchronization signal.

21. A method for synchronizing sampled signals, the method comprising:
using one or more circuits to perform the steps of:
receiving a first sampled signal;
storing a stored sampled signal in a memory, the stored sampled signal comprising a portion of the first sampled signal;
receiving a second sampled signal;
reading the stored sampled signal from the memory;
generating a restored sampled signal based on the stored sampled signal read from the memory;
outputting the second sampled signal; and
outputting an output sampled signal synchronized to the second sampled signal, the output sampled signal being based on the restored sampled signal.

22. The method of claim 21, wherein the first sampled signal comprises sub-carrier burst samples, and wherein outputting the output sampled signal synchronized to the second sampled signal comprises utilizing the sub-carrier burst samples to synchronize the output sampled signal to the second sampled signal.

23. The method of claim 21, wherein outputting the output sampled signal synchronized to the second sampled signal comprises:
initially outputting the output sampled signal synchronized to the second sampled signal using open loop timing control; and
thereafter adjusting the timing of the output sampled signal relative to the second sampled signal using closed loop timing control.

24. A system for synchronizing a first sampled signal and a second sampled signal, the system comprising:
one or more circuits that receives the first sampled signal and the second sampled signal;
a memory circuit communicatively coupled to said one or more circuits;
said one or more circuits stores a stored sampled signal in the memory circuit, the stored sampled signal comprising at least one of the first sampled signal and a signal derived from the first sampled signal;
said one or more circuits reads the stored sampled signal from the memory circuit;
said one or more circuits outputs the second sampled signal; and
said one or more circuits outputs an output sampled signal synchronized to the second sampled signal, the output sampled signal being based on the stored sampled signal read from the memory circuit.

25. The system of claim 24, wherein the first sampled signal comprises sub-carrier burst samples, and wherein said one or more circuits outputs the output signal synchronized to the second sampled signal utilizing the sub-carrier burst samples to synchronize the output signal to the second sampled signal.

26. The system of claim 24, wherein the signal derived from the first sampled signal comprises a cropped version of the first sampled signal.

27. The system of claim 24, wherein said one or more circuits comprises:
one or more sub-circuits that outputs the output sampled signal synchronized to the second sampled signal using open loop timing control; and
said one or more sub-circuits adjusts the timing of the output sampled signal relative to the second sampled signal using closed loop timing control.

* * * * *